July 19, 1927.

W. O. BARTLETT

MEASURING DEVICE

Filed Aug. 20, 1926.

Inventor

William O. Bartlett.

By *A. J. O'Brien*

Attorney

Patented July 19, 1927.

1,636,036

UNITED STATES PATENT OFFICE.

WILLIAM O. BARTLETT, OF DENVER, COLORADO.

MEASURING DEVICE.

Application filed August 20, 1926. Serial No. 130,465.

This invention relates to improvements in measuring devices and has reference more particularly to a measuring device or scale for determining the sizes and proportions of animals such, for example, as dogs.

In judging dogs for the purpose of determining their nearness to an ideal criterion it is necessary to make several measurements, such as the height, length, depth and thickness of chest, etc., for the purpose of determining the proportions and for making comparisons with the criterion and with other animals or dogs that may be competing.

It is the object of the invention to produce a scale or measuring device that shall be so constructed that it will be particularly well adapted for taking the measurements of dogs and which can be easily adjusted and read. My invention can be most clearly described and will be most readily understood when reference is had to the accompanying drawing in which the preferred embodiment thereof has been illustrated and in which—

Fig. 1 is a plan view of my invention, a part thereof being broken away to reduce the size.

Fig. 2 is a perspective view showing the construction of the detachable pointer.

Fig. 3 is a section taken on line 3—3 Fig. 1.

Fig. 4 is a section taken on line 4—4, Fig. 1, and

Fig. 5 is a view showing my device used for determining the height of a dog.

My improved measuring device consists of a wooden bar 1 which is graduated in inches and fractions of inches. Secured to the opposite sides of this bar are metal strips or binders 2 and 3 which serve to strengthen the bar and to provide smooth surface for the slide 4 to move along. The slide 4 has a flat side 5 that is parallel with the metal strip 3 and a transverse wall or side 6 which is perpendicular to the part 5 and which engages the edges of the parts 1, 2 and 3 in the manner shown in Fig. 4. This slide is also provided with a portion 7 which is parallel to the side 5 and engages the strip 2. The edge of the part 5 is provided with fingers 8 and 9 which are bent over the edges of the strips 1 and 3. The parts are adjusted so that the slide 4 may be moved and still have sufficient friction to maintain it in a desired position. Secured to the part 7 is a pointer 10 which extends over the scale and assists in reading the same. A pin or rod 11 is secured to the wall 6 and extends perpendicular to the same in the plane of the bar 1. Secured to the ends of the parts 1, 2 and 3 is a detachable portion which has been indicated as a whole by the reference numeral 12 in Fig. 2. This detachable portion is made of sheet metal and has a side wall 13, and walls 14 and 15 and bent over portions 16 and 17. The end wall 14 is somewhat narrower than the end portion 15 for the reason that the distance between the adjacent surfaces of the walls 13 and 16 is merely the thickness of the parts 1 and 3, while the distance between the adjacent surfaces of the walls 13 and 17 is equal to the combined thickness of parts 1, 2 and 3. A rod 18 is secured to the cap 12 and extends outwardly at right angles to the same. The rod 18 is of substantially the same length as the rod 11 and when the cap 12 is in place on the end of the scale in the manner shown in Fig. 1 the rods 11 and 18 will be parallel to each other along their inner sides. The inner side of the rod 18 is in line with the end of the scale or ruler, and the pointer 10 is in line with the side of the rod 11 that is adjacent the rod 18 so that the pointer 10 indicates that part of the scale that represents the actual distance between the adjacent surfaces of the rods 11 and 18. It is now apparent that if a certain distance to be measured as, for example, the height or length of a dog or other animal, the measuring device arranged with the adjacent sides of the parts 11 and 18 contacting the extreme portions whose distance apart is to be determined, this distance can then be easily read from the scale. In Fig. 1 the distance indicated by the pointer is thirty-two (32) inches. After the slide 4 has been adjusted it is desirable that it shall not readily be moved, and I have therefore provided a spring 19 which is secured to the side 5 and presses against the strip 3 so as to produce sufficient friction to prevent unauthorized movement.

In Fig. 5 I have shown the outline of a dog and have indicated my measuring device in position for the purpose of determining the height of the dog. It will be noted from Fig. 1 that the side of the rod 18 extends in line with the zero or very end portion of the scale so that the distance between the rods 11 and 18 can be directly read from the scale. If we now desire to measure the height of an animal it is necessary to remove the cap 12 which can be readily done in the manner indicated in Fig. 2. The end of the scale is then placed upon the floor and the rod 11 adjusted to the proper height. When it is desired to measure the length of an animal or dog as, for example, to determine the distance A in Fig. 5, the rods 11 and 18 must both be employed and the correct distance between the same will then be indicated by the pointer 10. In like manner depth and width of chest and various other measurements may be determined. When the measuring device is not in use the slide 4 and the cap 12 may both be removed so as to enable the measuring device to be packed in a small casing and to obviate all danger of bending the rods 11 and 18. When the measuring device is to be used the parts are assembled in the manner shown in Fig. 1. The re-enforcing metal strips 2 and 3, besides adding strength to the wooden bar 1, also give a finished appearance to the article and provide smooth surface for the slide 4 to cooperate with. The spring 19 is also important as it prevents accidental movement of the slide 4 after the measurements have been determined so that the reading of the scale may be kept from altering until a proper record has been made of the same.

I have found the above measuring device to be of great assistance in judging dogs at dog shows and it is obvious that it can also be used for many other purposes.

Having described the invention what is claimed as new is—

A measuring device comprising, in combination, a wooden bar of rectangular cross-section having a metal strip (3) secured to one side said strip being of the same width as the bar, a narrow metal strip (2) secured to the other side, a cap (12) removably secured to one end of the bar, a rod (18) secured to the cap and extending at right angles to the bar, a slide (4) secured to the bar and movable therealong, a pointer (10) secured to the slide, a rod (11) also secured to the slide and extending parallel with the rod (18) and a spring (10) secured to the slide and having one end in frictional engagement with the strip 2.

In testimony whereof I affix my signature.

WILLIAM O. BARTLETT.